(12) United States Patent
Schröder et al.

(10) Patent No.: US 7,111,792 B2
(45) Date of Patent: Sep. 26, 2006

(54) EXTENSIBLE CONNECTOR FOR CONDUCTOR RAILS

(75) Inventors: Arno Schröder, Castrop-Rauxel (DE);
Michael Heitmann, Kamen (DE);
Manuela Westermann, Kamen (DE)

(73) Assignee: Paul Vahle GmbH & Co. KG, (DE)

(*) Notice: Subject to any disclaimer, the term of this patent is extended or adjusted under 35 U.S.C. 154(b) by 30 days.

(21) Appl. No.: 10/492,879

(22) PCT Filed: Jul. 11, 2002

(86) PCT No.: PCT/EP02/07724

§ 371 (c)(1),
(2), (4) Date: Aug. 16, 2004

(87) PCT Pub. No.: WO03/033293

PCT Pub. Date: Apr. 24, 2003

(65) Prior Publication Data

US 2004/0251103 A1 Dec. 16, 2004

(30) Foreign Application Priority Data

Oct. 17, 2001 (DE) .............................. 101 50 694

(51) Int. Cl.
*E01B 11/54* (2006.01)

(52) U.S. Cl. .............. 238/14.1; 238/14.12; 238/14.13; 238/14.14; 191/44.1

(58) Field of Classification Search ............... 191/44.1; 238/14.1, 14.9, 14.12, 14.3, 14.4, 14.5, 14.7, 238/14.13, 14.14; 439/115, 33; 174/94 S, 174/73.1, 75 R, 75 D, 79, 74 A
See application file for complete search history.

(56) References Cited

U.S. PATENT DOCUMENTS

| 2,092,505 A | * | 9/1937 | Gort | 238/14.12 |
| 2,831,071 A | * | 4/1958 | Taylor | 191/44.1 |
| 2,933,567 A | * | 4/1960 | Mageoch | 191/40 |
| 3,813,502 A |  | 5/1974 | Bommart |  |
| 4,219,108 A |  | 8/1980 | Doring |  |

FOREIGN PATENT DOCUMENTS

| DE | 30 13 111 A1 | 3/1980 |
| DE | 197 55 513 A1 | 12/1997 |

* cited by examiner

Primary Examiner—Mark T. Le
(74) Attorney, Agent, or Firm—Synnestvedt Lechner & Woodbridge LLP

(57) ABSTRACT

A connector for connecting two conductor rail sections, the connector having an electrical conductor that is fastened at each end to the conductor rails. A central region of the conductor is fastened to a connection element. The connection element is slidingly connected to both of the two conductor rails. The electrical conductor has two flexible, undulating portions. These are located between the central region of the electrical conductor and each of its two, attached ends, and serve to compensate for the expansion and contraction of the two conductor rails with changes in temperature.

9 Claims, 2 Drawing Sheets

EXTENSIBLE CONNECTOR FOR CONDUCTOR RAILS

CROSS REFERENCE TO RELATED APPLICATIONS

This application claims the priority of PCT Application No. PCT/EP02/07724 filed on Jul. 11, 2002, and German Application DE 101 50 694.5 filed on Oct. 17, 2001, the contents of which are hereby incorporated by reference.

BACKGROUND OF THE INVENTION

1. Field of the Invention

The present invention relates to a connector for connecting two conductor rail sections, the connector having at least one electrical conductor and one of its respective ends being connected in a conductive manner to a respective conductor rail section, the connector having a connection element which connects the facing ends of the conductor rail sections to one another.

2. Description of Related Art

Generic conductor rail connectors are also frequently called extensible connectors, these connectors compensating a length change in the conductor rail sections owing to temperature influences and conducting the electrical current from one conductor rail section to the next.

The electrical conductor of generic connectors is designed either flexibly or rigidly, the electrical conductor in the rigid configuration thereof having to be formed in such a way that in the event of length changes of the conductor rail sections, the electrical conductor can be deformed and its length thus changed. If large electrical currents have to be transmitted from one conductor rail section to the next, relatively large cross-sections of the electrical conductor of the connector are required. As the flexibility of an electrical conductor decreases with the cross-section, a plurality of electrical conductors, for example flexible copper strands or copper cables, are frequently used for large current intensities for electrical current transmission. These cables lie outside the conductor rail and therefore need addition space. Owing to the fact that the connectors are fastened on the side of the conductor rail sections remote from the sliding face, the ends of the conductor rail sections cannot be fastened to a carrier or other parts by means of fastening elements, so they can swing freely. As already explained, the electrical conductor is to be designed with a large cross-section so large electrical currents can be transmitted. This produces the problem that relatively high pressure forces occur to change the air gap between the ends of the conductor rail sections owing to temperature variations, so the conductor rail suspensions are subject to large loadings.

Owing to the pressing force of a current collector, the conductor rail section, in particular the freely swinging ends thereof, are moved out of their normal position so the adjoining ends of the conductor rail sections no longer adjoin in an impact-free manner and therefore the current collector can be permanently damaged when the ends of the conductor rail sections are traversed.

SUMMARY OF THE INVENTION

It is the object of the present invention to provide a connector or extensible connector for conductor rail sections which ensures that the conductor rail ends adjoin in an impact-free manner and which has relatively small dimensions even with high current intensities.

The connector or extensible connector according to the invention serves to compensate the length change in the conductor rail sections between defined fixed points. It combines both the electrical current transmission from conductor rail section to conductor rail section and the mechanical guiding of the conductor rail section ends, in order to achieve impact-free transition at the air gap in the region of the sliding faces of the conductor rail sections.

For this purpose, the connection element is advantageously mounted in a displaceable or sliding manner at the ends of the conductor rail sections. The ends of the conductor rail sections are advantageously always aligned with respect to one another by the connection element. Owing to the sliding or displaceable mounting of the connection element at the facing ends of adjacent conductor rail sections, the ends of the conductor rail sections can move towards or away from one another owing to thermal expansion or thermal contraction, wherein they are always held in position with respect to one another by the connection element.

Since the electrical conductor is fastened to the connection element, the connection element always remains in the region of the ends of the two conductor rail sections and requires no additional fastening. The connection element, for improved mounting, advantageously has a bearing part made of wear-resistant plastics material, by means of which a low coefficient of friction is produced between the connection element and conductor rail section. It is also advantageous if the electrical conductor consists of a parcel of joined, flexible, lamellar strips. The required size of the cross-section can therefore be adapted to the respective current loading capacity without the outer overall size being substantially influenced. The individual lamellar strips or foils are pressure welded at the contact points and copper clad aluminium sheets are placed underneath owing to the contact corrosion.

The electrical conductor, which is in particular a Cu lamellar strip is advantageously constructed in such a way that the total extension path is divided into two partial extension paths. The mechanical stress in the movable partial region of the electric conductor is therefore sharply reduced. Since the electrical conductor is fastened to the connection element, in particular screwed on, a further improvement in the flexural strength of the total connector is produced. The partial extension paths are advantageously produced by an undulating shaping of the electrical conductor. However, it is also possible to provide a saw tooth-shaped shaping of the electrical conductor or to lay it in loops. Owing to the special undulating design, a reduction in the pressure force required to change the air gap between the ends of the conductor rail sections is advantageously produced, whereby the load on the conductor rail attachments is advantageously reduced.

It is also advantageous if the width of the electrical conductor or of the Cu lamellar strip is smaller relative to the opening of the C-profile of the conductor rail sections in the case of conductor rail sections which are C-shaped in cross-section, so that the in particular undulating shaping or the inner half-wave can submerge into the C-profile when the ends of the conductor rail sections are pushed together, so a small overall height can advantageously be achieved over the total extension region of the connector.

A possible embodiment of the connector according to the invention is described in more detail hereinafter with the aid of the drawings, in which:

DETAIL DESCRIPTION OF THE INVENTION

Figure 1:
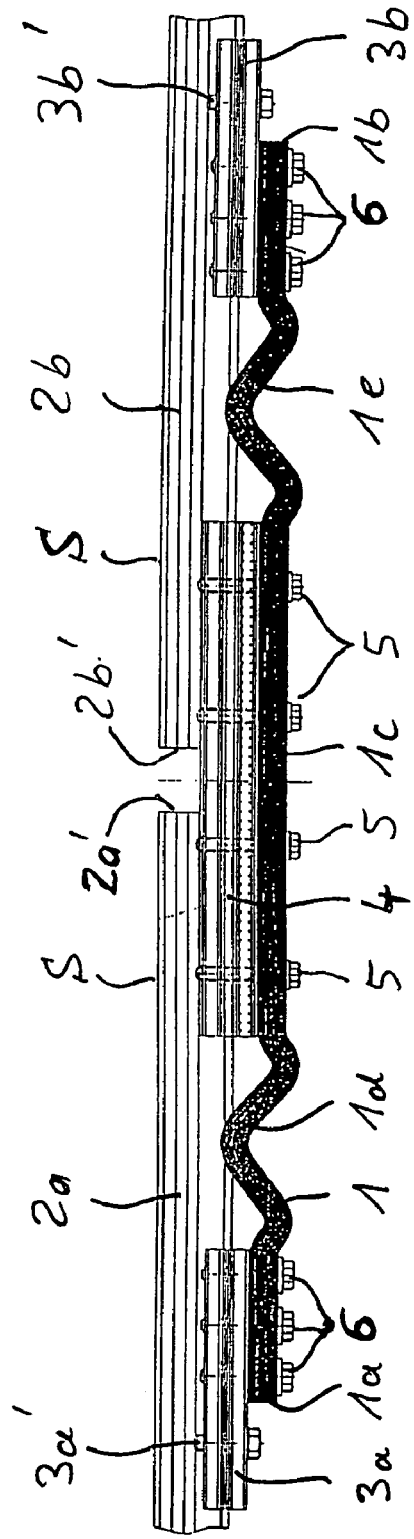
FIG. 1 shows conductor rail sections connected by a connector according to the invention.

FIG. 1 shows two conductor rail sections 2a and 2b, the ends 2a' and 2b' of which are spaced apart from one another. The conductor rail sections 2a and 2b each have an upwardly pointing sliding face S in FIGS. 1 to 3. The current rail sections are electrically connected via the connector according to the invention. The current rail sections consist of an aluminium profile, the cross-section of which is substantially C-shaped (FIG. 3). The electrical conductor 1 serves for the conveyance of current from one conductor rail section to the other. For this purpose, fastening means 3a and 3b are provided on the conductor rail sections 2a and 2b, one respective end 1a or 1b of the electric conductor 1 being fastened in a conductive manner to a fastening means 3a or 3b by means of fastening screws 6. The fastening means 3a and 3b are rigidly fastened by means of fastening screws 3a' and 3b' to each conductor rail section 2a and 2b. Arranged in the region of the ends 2a' and 2b' of the conductor rail sections 2a and 2b is a connection element 4 which is mounted in a displaceable and sliding manner in the conductor rail sections 2a and 2b designed as profile bodies. The central region 1c of the electrical conductor 1 is fastened by means of fastening screws 5 to the connection element 4. The connection element 4 and electrical conductor 1 mutually reinforce one another thereby, so the total system receives a higher rigidity.

The mounting of the connection element 4 in the ends of the conductor rail sections 2a and 2b takes place in the direction of the longitudinal extent of the conductor rail sections 2a and 2b so the ends 2a' and 2b' of the conductor rail sections 2a and 2b can approach one another (FIG. 2) or distance themselves from one another owing to temperature length changes. The ends 2a' and 2b' of the conductor rail section 2a and 2b are guided by the connection element 4, so the sliding faces S always lie in an impact-free manner in one plane. The electric conductor 1 is always shaped in an undulating manner between the connection pieces 3a and 3b and the connection element 4, so a change in length of the conductor rail sections 2a and 2b can be compensated by these region 1d and 1e of the electrical conductor 1.

Figure 2:
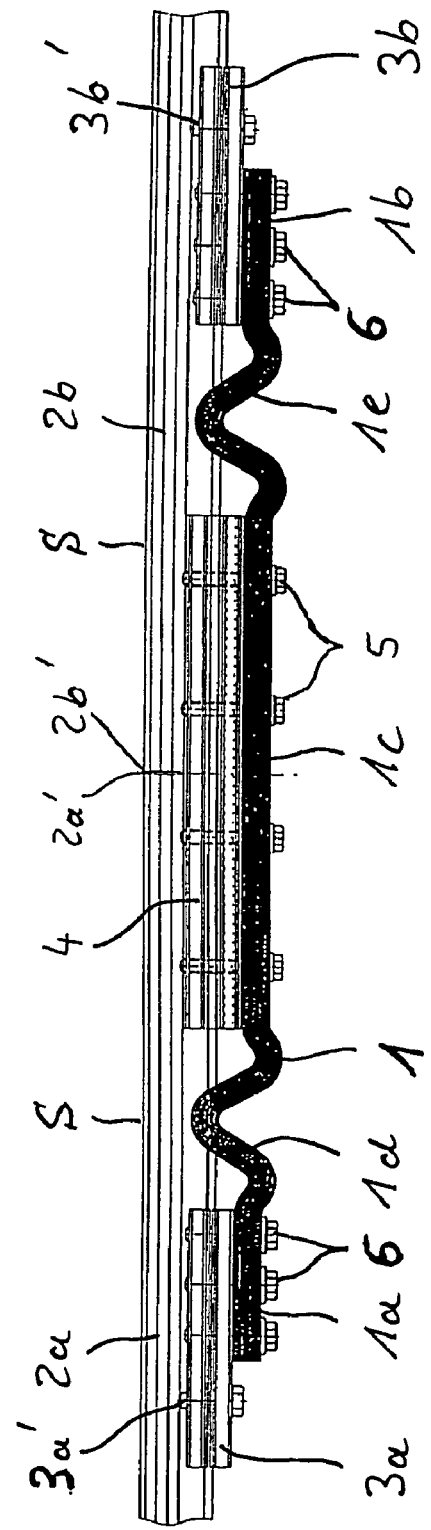
FIG. 2 shows an arrangement according to FIG. 1 with ends of the conductor rail sections approaching one another owing to thermal change in length.
Figure 3:
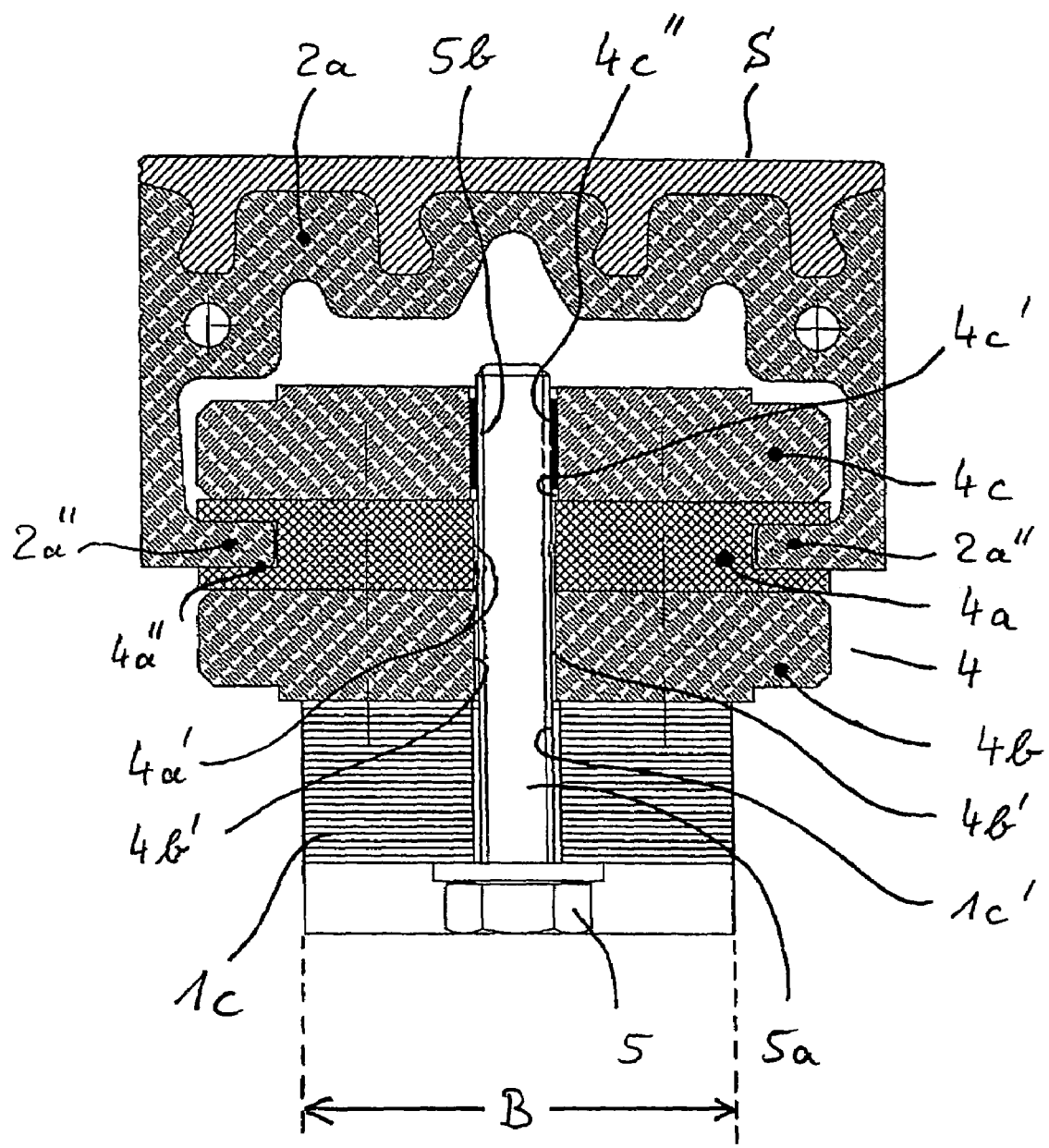
FIG. 3 shows a cross-sectional view through an arrangement according to FIG. 1.

As shown in FIGS. 1 and 2, the shaping of the regions 1d and 1e is such that it consists of two smaller half-waves and a central larger half-wave, the central larger half-wave pointing in the direction of the conductor rail sections 2a and 2b. If the conductor rail sections 2a and 2b move the fastening elements 3a and 3b towards one another owing to the thermal length change, a length compensation may take place owing to the regions 1d and 1e, the central half-waves engaging or immersing in the lower opening of the C-shaped profile of the conductor sections owing to their configuration. For this purpose, the width B of the electrical conductor which is manufactured in particular as a Cu lamellar strip, is smaller than the spacing of the collar-shaped projections 2a" of the respective conductor rail section serving to guide the connection element, so a smaller overall height of the total arrangement is achieved.

As shown in FIG. 3, the connection element 4 consists of two plate-shaped parts 4b and 4c and a bearing part 4a arranged therebetween which, on its elongate flat sides, has longitudinal grooves 4a" in which the projections 2a" engage.

A plurality of screws 5 with their shaft 5a penetrates the region 1c of the electrical conductor 1, the plate-shaped parts 4b and 4c and the bearing part 4a. For this purpose, the electrical conductor 1, the plates 4b and 4c and the bearing part 4a have corresponding through-holes 1c', 4a', 4b' and 4c'. The screw 5, at its shaft end, has an external thread 5b which corresponds to an internal thread 4c" of the plate 4c. By tightening the screws 5, the parts penetrated by the screw 5 are pressed together by means of their screw head and the plate 4c and held together permanently. The longitudinal grooves 4a" are not thus influenced in their fit.

To assemble the arrangement, the conductor rail sections 2a and 2b are assembled one after the other on holders, not shown, by means of insulators. As at least the connection element 4 with its bearing part 4a has to be pushed from the end face of the conductor rail section profile onto the projections 2a", at least the connection element 4 has to be pushed in advance prior to the assembly of the second conductor rail section onto the conductor rail section still to be assembled or already assembled. To allow a subsequent assembly of the connector when the conductor rail sections are already assembled, it is possible for the bearing part 4a to consist of two parts, the two parts then also being held together by the screws 5.

It is obviously possible for the fastening elements 3a and 3b to be designed in their basic structure similar to the construction of the connection element 4, the bearing part 4a which in particular in the connection element 4 is manufactured from plastics material, then being replaced by a constructionally identical part, but made of a conductive material, so a transition resistance which is as small as possible is produced between the conductor rail section and the electrical conductor.

In a further embodiment, not shown, the connection element can be rigidly mounted on one end of a first conductor rail section, in particular screwed on, wherein it is mounted in a displaceable or sliding manner in the end of the other conductor rail section. In this embodiment, the connection element can be designed in such a way that the rigidly mounted part of the connection element transmits the electrical current from the electrical conductor to the conductor rail section. In this embodiment, only one fastening means 3a or 3b is advantageously required which is fastened to the second conductor rail section. However, there is no division here of the extension path into two partial extension paths which are spatially separated from one another by the connection element. The shapings of the electrical conductor have to be adapted in the process according to requirements. In order to achieve stability which is as high as possible with simultaneously small overall height, the electrical conductor in this embodiment is also fastened to the region of the connection element which is mounted in a sliding or displaceable manner on the second conductor rail section. A higher rigidity of the region of the electrical conductor located between the connection element and the fastening means can thus be achieved.

While the invention has been described with reference to the preferred embodiment thereof, it will be appreciated by those of ordinary skill in the art that modifications can be made to the parts that comprise the invention without departing from the spirit and scope thereof.

The invention claimed is:

1. Connector for connecting a first and a second conductor rail section (2a, 2b), the connector comprising:
   an electrical conductor (1), having a first end (1a) connected to said first conductor rail section (2a) in a conductive and fixed manner and a second end (1b) connected to said second conductor rail section (2b) in a conductive and fixed manner;
   a connection element (4) connecting the facing ends (2a', 2b') of said first and second conductor rail sections (2a, 2b) to one another, characterised in that the connection element (4) is mounted in a displaceable or sliding manner in or on both of the two mutually facing ends (2a', 2b') of said first and second conductor rail sections (2a, 2b), and a central region of said electrical conductor (1) is fastened to the connection element (4) and wherein said electrical conductor further comprises a first undulating section between said central region of said electrical conductor and said first end said electrical conductor and a second undulating section between said central region of said electrical conductor and said second end of said electrical conductor.

2. Connector according to claim 1, characterised in that the connection element (4) has a bearing part (4a) which is manufactured, in particular, from a wear-resistant material, in particular plastics material.

3. Connector according to claim 2, characterised in that the bearing part (4a) has grooves (4a") extending in the longitudinal direction of the connection element (4), which grooves (4a") serve as a guide profile and in which grooves in particular collar-shaped projections (2a", 2b") of the conductor rail sections (2a, 2b) engage.

4. Connector according to claim 2, characterised in that the bearing part (4a) is arranged between two plate-shaped parts (4b, 4c) manufactured in particular from an electrically conductive material, the electrical conductor (1) resting with its central region (1c) on the side of the one plate-shaped part (4b) remote from the conductor rail section.

5. Connector according to claim 4, characterised in that the parts (4b, 4c), the bearing part (4a) and the conductor (1) are held together or pressed against one another by means of at least one fastening screw (5).

6. Connector according to claim 5, characterised in that the fastening screw (5) penetrates the parts (4b, 4c), the bearing part (4a) and the conductor (1), the part (4c) having a hole with an internal thread (4c') which corresponds to the external thread (5b) of the fastening screw (5).

7. Connector according to claim 1, characterised in that the said and first undulating sections of said conductor consist of two respective small half-waves and a larger half-wave arranged therebetween, the larger half-wave pointing with its wave peak in the direction of said first and second conductor rail sections (2a, 2b).

8. Connector according to claim 1, characterised in that the electrical conductor (1) is formed from stacked foil sheets.

9. Connector according to claim 1, characterised in that the width (B) of the electrical conductor (1) is such that the conductor (1) can engage, at least with parts of its shapings (1d, 1e), in recesses of the conductor rail sections.

* * * * *